United States Patent
Sarbacher

[15] 3,664,144
[45] May 23, 1972

[54] SELF POWERED REFRIGERATED DISPOSABLE CONTAINER

[72] Inventor: Robert I. Sarbacher, Arcadia, Calif.
[73] Assignee: John S. Bogue, Santa Monica, Calif.
[22] Filed: Dec. 15, 1969
[21] Appl. No.: 884,957

[52] U.S. Cl. ..................................................62/3, 136/90
[51] Int. Cl. ..............................................F25b 21/02
[58] Field of Search..........................................62/3; 136/90

[56] References Cited

UNITED STATES PATENTS

| | | | |
|---|---|---|---|
| 2,991,628 | 7/1961 | Tuck | 62/3 |
| 3,168,816 | 2/1965 | Petrie | 62/3 |
| 3,178,896 | 4/1965 | Sandsto | 62/3 |
| 3,194,023 | 7/1965 | Sudmeier | 62/3 |
| 3,214,922 | 11/1965 | Koblischek | 62/3 |
| 3,445,295 | 5/1969 | Smith | 136/90 |
| 3,310,953 | 3/1967 | Rait | 62/3 |
| 3,470,029 | 9/1969 | Meyers | 136/90 |

Primary Examiner—William J. Wye
Attorney—Witherspoon and Lane

[57] ABSTRACT

A container is equipped with a thermoelectric cooling device powered by a reserve battery which may be placed in a cavity within the container. An extension of the cold zone of the Peltier cooling device projects into the container in such a manner as to distribute the cooling surface to effect more rapid cooling of the contents. A heat exchanger is provided to carry away both the heat generated in the Peltier device and the heat generated by the internal resistance of the reserve battery during discharge. Provision is made to prevent heat carried by the battery terminals from entering the cooling compartment.

6 Claims, 2 Drawing Figures

PATENTED MAY 23 1972 3,664,144

INVENTOR
ROBERT I. SARBACHER 3,664,144

SELF POWERED REFRIGERATED DISPOSABLE CONTAINER

BACKGROUND OF INVENTION

There are a number of instances where it is desirable to cool the contents of a package or container as for example the contents of a can of beer or soft drink where it is desirable to use such contents immediately after cooling.

SUMMARY OF INVENTION

The present invention relates to the design of a container in which thermoelectric cooling elements are powered by a reserve battery, so as to cool the contents of the container when the reserve battery is energized. The reserve battery employed in this invention is of the type whose shelf life prior to activation is essentially unlimited and whose life once activated is sufficiently long to produce the electricity required for the specific application to which it is placed.

Reserve primary batteries or deferred action primary batteries are known to the art. They are batteries wherein the electrodes are fully assembled for operation, but the electrolyte is held in reserve in a separate container which may be within the battery housing. Since there is no consumption of the electrodes under these circumstances, the shelf life of the battery is essentially infinite, especially when the electrode compartment is evacuated during manufacture. Once the electrolyte is released from its reserve container such as by mechanical rupture, explosive squib rupture, pressure sufficient to rupture, or any other means known to the art, the battery is activated and thereafter has a limited life.

The components of the thermoelectric cooling device are likewise non-deteriorating when carefully manufactured and properly sealed. Thus, the combination of the battery and cooler may remain ready for use for an indefinite period of time.

In order to lessen the time required to effect the cooling of the contents of the container, the cold zone of the thermoelectric cooler may be extended within the container by the use of non-corrosive conducting materials such as stainless steel.

A heat exchanger is provided to carry away the heat generated by the thermoelectric device and by the battery when the combination are put into action after the battery is energized. This heat exchanger is insulated from the container so as to minimize the heat transmitted through the container to the contents.

The heat exchanger extends to the bottom of the container so that, if the container is placed on a conducting surface or on a wet surface after activation of the battery, the operation of the cooling unit will be more effective.

It is therefore one object of the present invention to provide refrigeration for the contents of a container without the need for separate or outside power source to cool the contents.

Another object of this invention is to provide cooling facilities having a specific cooling capacity to reduce the temperature of the contents of the container a specific amount.

Another object of this invention is to provide means to effect more rapid cooling of the contents of a container through the use of conducting fins or surfaces effectively extending the cooling surface within the container while using a minimum volume of the container interior. Still another object of the present invention is to provide a self contained cooling device which may be inserted in a cavity in a container the contents of which are to be cooled.

Still another object of the present invention is to provide means through which heat generated in the battery compartment of the cooler cannot be conducted through the terminals of the battery into the thermoelectric compartment.

Other objects and advantages of the present invention will become apparent to those skilled in the art from a consideration of the following detailed description of the specific embodiment of the invention in conjunction with the drawing provided.

DETAILED DESCRIPTION OF INVENTION

Figure 2:
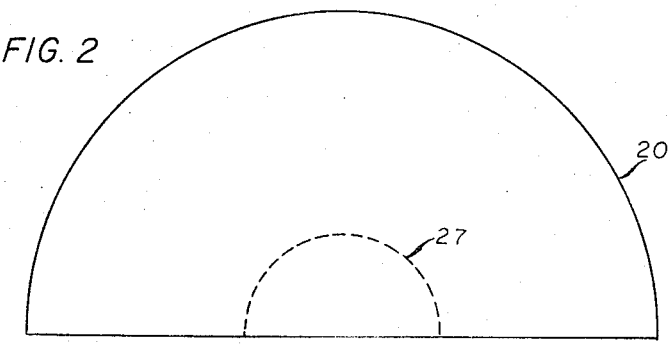
FIG. 1 is a schematic cross section view of a cylindrical container with a thermoelectric cooling unit and reserve primary battery incorporated therein in accordance with this invention and FIG. 2 is a top view of half of the container of FIG. 1.
Figure 1:
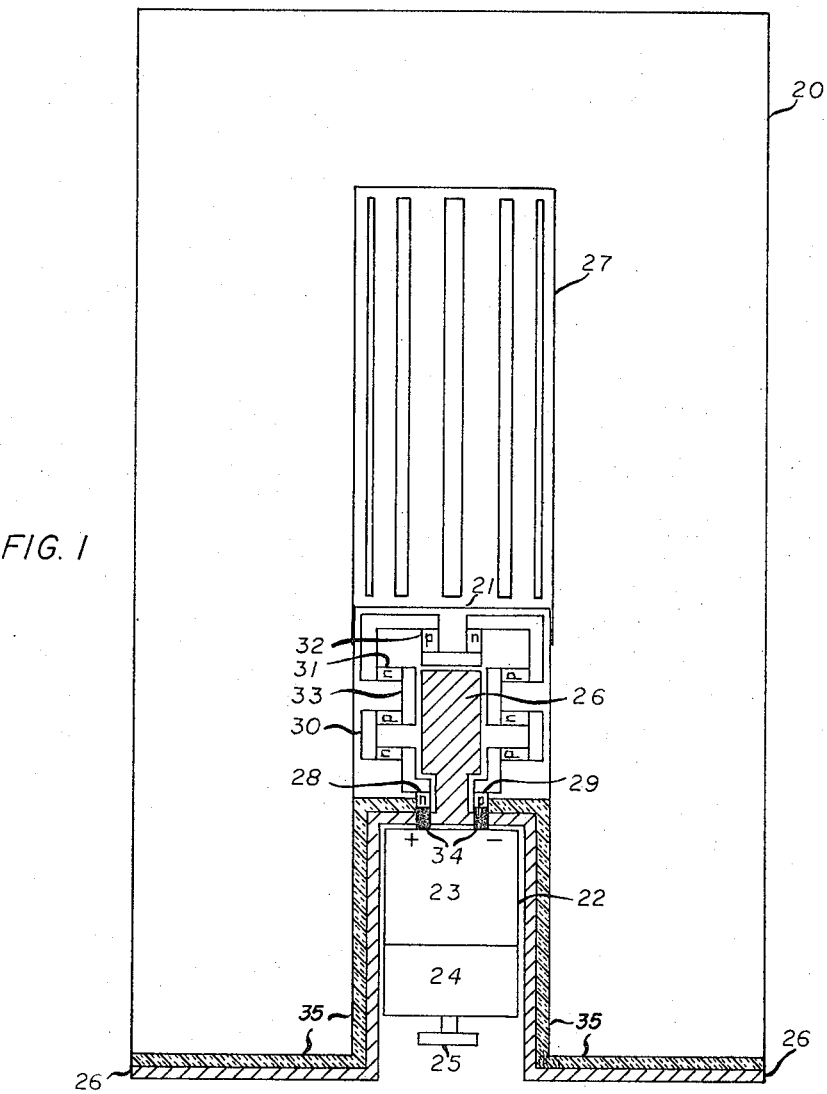

A container 20, a thermoelectric cooler 21 and a primary reserve battery 22 are shown in crossectional view in FIG. 1. These are schematically represented because various structures therefore are well known in the art and the details thereof are not material to the present invention. FIG. 2 is a top view of half of container 20. This view is given merely to show that container 20 may be a circular container of the type generally used for beer, softdrinks or other such type beverages. The battery is an electrochemical primary reserve cell having the electrode compartment 23 and the electrolyte compartment 24 indicated. When the plunger 25 is depressed it punctures the electrolyte container in the battery housing and thereby will release the electrolyte to the electrode compartment if inverted. The battery can, of course, be designed with the electrolyte compartment above the electrode compartment so that inversion is not necessary. However, for purposes of illustration the arrangement shown was selected. The output terminals 34 of the battery are indicated.

These terminals 34 are connected directly to the terminals of the thermoelectric cooler 28 and 29.

The Peltier cooling device, or thermoelectric cooler comprises in a known manner a series of $n$-type 31 and $p$-type 32 semiconductor elements which are connected in an electrically conductive manner by means of bridges 30 and 33 respectively, the bridges 30 for example, exhibiting a temperature which is lower than that of bridges 33 which are in contact with heat exchanger 26. When the battery 22 is energized the current flowing through the terminals 34 sets up a temperature difference due to the Peltier effect and a thermal transport from the cold side 30 to the heat exchanger 26 takes place, from which the heat is dissipated by means of the heat exchanger 26, thence to the air or to a conducting surface or wet surface upon which the container may be placed.

By inserting Peltier elements ($n$-type conductive) 28 in the positive lead and ($p$-type conductive) 29 in the negative lead from the terminals 34 the temperature of the bridges 33 is maintained at a lower temperature than that of the battery terminals 34, thus obstructing the heat generated in the battery electrodes under discharge conditions from entering the cooling element 21. This technique is of course well known in the art.

In order to prevent the heat generated from entering the container an insulator 35 is interposed between the heat sink 26 and the container 20 at all possible points of contact.

By placing a conducting non-corrosive material 27 in contact with the cold zone of the cooling element 21 and extending the surface of this material into the interior of the container 20, the temperature of the contents of the container 20 can be more rapidly reduced. FIG. 1 shows a slotted metallic cylinder 27 attached to the outside surface of the cooling element 21. Of course, the cold zone can be placed in contact with the walls of the container to effect this extension. The contents of the can may be removed from the can by using a conventional can opener, a V type shaped can opener or if the can is provided with a integral opening tap, the tap may be removed.

Many modifications and variations of the illustrated embodiment will be apparent to those skilled in the art. Accordingly, such modifications and variations as are embraced by the spirit and scope of the appended claims are considered to be within the purview of the present invention.

What is claimed is:

1. Apparatus for cooling the contents of a container comprising: a container for housing the substance to be cooled; a Peltier effect thermoelectric cooling unit; and a power supply connected to said cooling unit, said cooling unit and said power supply being installed within the confines of said container.

2. In a cooling device as set forth in claim 1 wherein the power supply is an electrochemical reserve primary battery.

3. In a cooling device as set forth in claim 1 wherein a heat sink is provided to remove the heat generated in the operation of the device.

4. In a cooling device as set forth in claim 1 wherein insulation is provided to prevent the heat generated in the operation of the device from reaching the contents of the container.

5. In a cooling device as set forth in claim 1 wherein the cold zone of the cooling unit is extended into the container interior by the use of non-corrosive conducting surfaces such as aluminum or stainless steel, so as to aid in the rapid cooling of the contents of the container and at the same time occupy a minimum amount of the volume of the interior of the container.

6. In a cooling device as set forth in claim 1 wherein the cold zone of the cooling unit is in contact with the said container to further extend the cold zone for more rapid cooling of the contents.

* * * * *